UNITED STATES PATENT OFFICE.

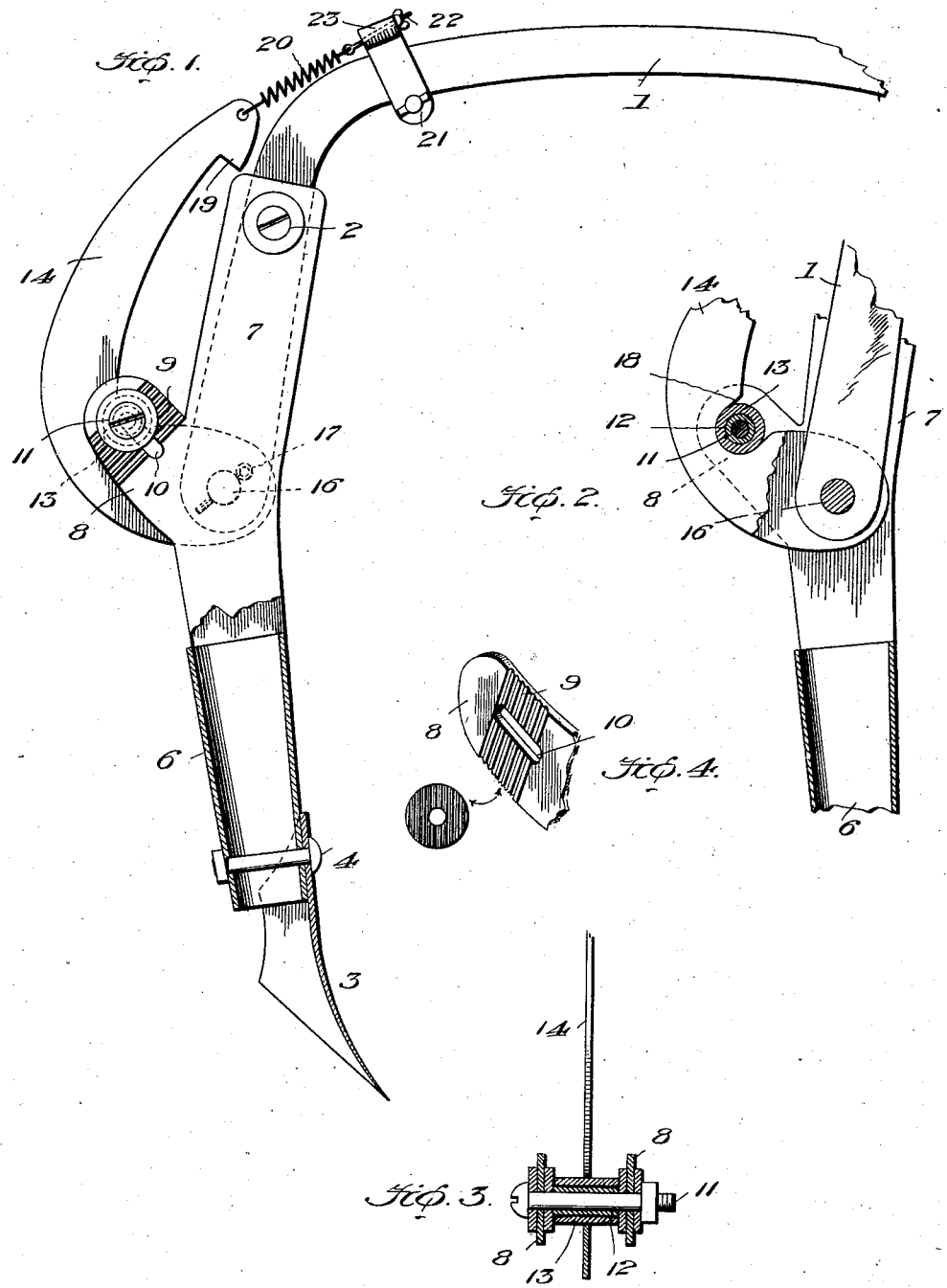

JOHN LANGENFELD, OF SIOUX CITY, IOWA.

SPRING-TRIP FOR CULTIVATOR-SHOVELS.

1,010,776.

Specification of Letters Patent. Patented Dec. 5, 1911.

Application filed May 22, 1911. Serial No. 628,743.

*To all whom it may concern:*

Be it known that I, JOHN LANGENFELD, a citizen of the United States, residing at Sioux City, county of Woodbury, and State of Iowa, have invented certain new and useful Improvements in Spring-Trips for Cultivator-Shovels, of which the following is a specification.

This invention relates to spring trips for cultivator shovels and has for its object the provision of a simple, strong and durable device of that character which will permit adjustments to set the shovel at the proper angle, position the spring trip in different relationships to the cultivator beam, lock the shovel securely against release under normal conditions, but permit instant release or tripping if an obstruction is encountered, and thus prevent breakage of the shovel, the parts automatically resetting themselves after the obstruction is passed.

The invention is set forth fully hereinafter and the novel features are recited in the appended claims.

In the accompanying drawings:—Figure 1 is a side elevation, partially in section; Fig. 2, a detail section through the pivot of the trip and the engaging device on the trip and shank; Fig. 3, a cross section through the engaging device of the trip and shank; and Fig. 4, a detail perspective of one of the washers and the corrugated or serrated part of one of the arms of the shank.

The cultivator beam 1 is of ordinary construction, and to this beam there is pivoted at 2, the shank for the shovel, which is shown at 3, these being secured together in any suitable manner, as by fastenings 4. The body 6 of the shank may be tubular or solid to give it strength, and it is provided with arms 7 lying on opposite sides of the beam 1 and pivoted thereto at 2. The arms 7 have extensions 8 which are corrugated on their outer faces at 9 and are provided with registering slots 10 through which passes a bolt 11 having suitable washers and a nut and provided with a spacing sleeve 12 which keeps the arms 8 apart and amply braces them. Loose on the sleeve is a roller or bowl 13.

The trip 14 is provided with a bifurcation which straddles the lower end of the beam 1 and is pivoted thereto by a pin 16 and held thereon by cotters 17 so that it cannot work loose. This trip is provided with a notch 18 rounded and shaped so that it is adapted to snugly yet easily receive the roller or bowl 13, and at its upper end it is provided with a hook 19 which is adapted to limit the distance the shovel may move rearwardly so as to prevent the parts from becoming detached. A spring 20 connects the free end of the trip to a clamp 21 which is adjustable on the beam 1. Preferably, a screw-threaded tension bolt 22 is employed, passing through a loop 23 on the clamp to enable the spring tension to be adjusted according to circumstances.

The adjustability of the bolt 11 in the slots 10 and securement of it, enables the shovel to be initially set for operation at any desired angle. Preferably the washers on the bolt 11 are corrugated to engage the corrugations 9 to secure the bolt against movement in the slots, once it has been adjusted.

Normally the roller or bowl 13 is disposed in the recess or notch 18 and the tension of the spring maintains the shank and shovel in this locked position. When an obstacle is encountered, the pressure becomes sufficiently great to overcome the tension of the spring and the bowl 13 thereupon rides out of the notch 18 and along the inner edge of the trip 14, its ultimate movement being limited by its engagement with the head or shoulder 19, if the pressure is such as to cause it to swing back that far. When the obstacle is passed, the tension of the spring causes the trip to act as a cam on the roller or bowl 13 and snaps the bowl back into the notch 18 for subsequent normal operation of the shovel.

Having thus described my invention, what I claim as new and desire to secure by Letters Patent, is:—

1. In a spring trip for cultivator shovels, the combination with a cultivator beam or standard, of a shovel carrying shank pivoted thereto, a spring-actuated trip pivoted to the standard or beam and provided with an engaging member, and a member carried by the shank which is engaged with said member to thereby retain the shank in normal position by the spring tension exerted on the trip, said spring-actuated trip being disposed in upright position so that on the release of the engaging member the said member will bear against the trip as the shank moves from normal position, whereby when the obstacle is passed, the spring tension on the trip will cause the shank to automatically re-set itself in normal position.

2. In a spring trip for cultivator shovels, the combination with a cultivator beam or standard, of a shovel-carrying shank pivoted thereto, a shiftable member adapted to be secured at different positions on said shank, and a spring-actuated trip pivoted to the standard or beam and having a device adapted to engage the adjustable member to lock the shank in normal position.

3. In a spring-actuated trip for cultivator shovels, the combination with a beam or standard, of a shovel-carrying shank having arms which are disposed on opposite sides of the beam or standard and pivoted thereto, said arms being provided with slots, a bolt passing through said slots and adapted for positioning and securement at different points thereof, a trip pivoted to the beam or standard between the arms of the shank and provided with a notch to engage the bolt aforesaid, said trip having an upwardly extending part provided with a stop or head, and a spring connecting the free end of the trip with the standard or beam.

4. In a spring-actuated trip for cultivator shovels, the combination with a beam or standard, of a shovel-carrying shank having arms which are disposed on opposite sides of the beam or standard and pivoted thereto, said arms being provided with slots, a bolt passing through said slots and adapted for positioning and securement at different points thereof, a trip pivoted to the beam or standard between the arms of the shank and provided with a notch to engage the bolt aforesaid, said trip having an upwardly extending part provided with a stop or head, a clamp adjustably secured on the standard or beam, and a spring and tension adjusting device connecting the trip with the clamp.

In testimony whereof, I hereunto affix my signature in presence of two witnesses.

JOHN LANGENFELD.

Witnesses:
A. V. CONVERSE,
H. A. DOYLE.

---

Copies of this patent may be obtained for five cents each, by addressing the "Commissioner of Patents, Washington, D. C."